United States Patent
Redler, IV

(10) Patent No.: US 10,936,794 B2
(45) Date of Patent: Mar. 2, 2021

(54) HIGH-PERFORMANCE WEB-BASED CLOUD SERVICES SYSTEM AND METHOD USING DATA LINK REDIRECTION

(71) Applicant: Keepsayk LLC, Glen Ellyn, IL (US)

(72) Inventor: Steve Redler, IV, Milltown, NJ (US)

(73) Assignee: KEEPSAYK LLC, Glen Ellyn, IL (US)

( * ) Notice: Subject to any disclaimer, the term of this patent is extended or adjusted under 35 U.S.C. 154(b) by 911 days.

(21) Appl. No.: 14/749,353

(22) Filed: Jun. 24, 2015

(65) Prior Publication Data
US 2015/0370762 A1 Dec. 24, 2015

Related U.S. Application Data

(60) Provisional application No. 62/016,598, filed on Jun. 24, 2014.

(51) Int. Cl.
*G06F 40/134* (2020.01)
*G06F 16/955* (2019.01)

(52) U.S. Cl.
CPC .......... *G06F 40/134* (2020.01); *G06F 16/955* (2019.01)

(58) Field of Classification Search
CPC ............ G06F 17/2235; G06F 17/2241; G06F 17/30014; G06F 17/30876; G06F 17/30899; G06F 40/134; G06F 16/955; G06F 16/951; G06F 16/957
See application file for complete search history.

(56) References Cited

U.S. PATENT DOCUMENTS

| | | | |
|---|---|---|---|
| 6,453,335 B1 * | 9/2002 | Kaufmann | H04L 67/20 707/999.01 |
| 6,957,224 B1 * | 10/2005 | Megiddo | G06F 17/30876 |
| 8,543,715 B1 * | 9/2013 | Rabbat | G06F 17/30864 709/219 |
| 8,880,635 B1 * | 11/2014 | Singh | G06F 17/30902 709/213 |
| 9,083,729 B1 * | 7/2015 | Doshi | H04L 63/1408 |
| 2003/0208472 A1 * | 11/2003 | Pham | G06F 17/30876 |
| 2008/0114868 A1 * | 5/2008 | Thayer | H04L 29/12594 709/223 |
| 2008/0209327 A1 * | 8/2008 | Drucker | G06F 9/542 715/733 |
| 2009/0313320 A1 * | 12/2009 | Parsons | H04L 67/1097 709/203 |
| 2010/0205196 A1 * | 8/2010 | Schreiber | G06F 9/4448 707/758 |
| 2012/0239731 A1 * | 9/2012 | Shyamsunder | G06F 17/30876 709/203 |

OTHER PUBLICATIONS

Rhys Lewis, "Dereferencing HTTP URIs", publisher: www.w3.org, published: Aug. 2007, pp. 1-20.*

* cited by examiner

*Primary Examiner* — Wilson W Tsui
(74) *Attorney, Agent, or Firm* — DLA Piper LLP (US)

(57) ABSTRACT

A high-performance web-based cloud services system and method by data link redirection are provided. The system and method provide ways to build, deploy, and scale online cloud-based web applications without necessarily requiring large investments in hardware infrastructure and network bandwidth.

19 Claims, 3 Drawing Sheets

HIGH-PERFORMANCE WEB-BASED CLOUD SERVICES SYSTEM AND METHOD USING DATA LINK REDIRECTION

PRIORITY CLAIM

This application claims priority under 35 USC 120 and the benefit under 35 USC 119(e) to U.S. Provisional Patent Application Ser. No. 62/016,598 filed on Jun. 24, 2014 and entitled "High-Performance Web-Based Cloud Services By Data Link Redirection", the entirety of which is incorporated herein by reference.

FIELD

The disclosure relates to web-based cloud services and in particular to web-based cloud services using data link redirection.

BACKGROUND

The current plethora of commercial cloud services which are available to developers of web-based and mobile-app-based applications has been a boon to the technology startup community. Whereas in previous decades a web-based software startup needed to raise considerable investment capital to merely get started, today a startup can use a cloud resource such as Amazon's® AWS to begin with relatively meager funding, yet create a system that can auto-scale to be able to handle millions of users.

The cloud service provider provides storage, virtual machines, and a set of software services to facilitate the development of large systems. This allows both startups and existing companies to quickly build and deploy large cloud services that aren't technically resource constrained, systems that can activate additional storage, CPUs, services, and bandwidth.

If such systems are properly designed, the applications can be scaled up by adding on CPUs and storage, as well as bandwidth either manually or via automatic algorithms.

If the developer has designed an appropriate economic model for the application, and if it is properly implemented, then the company may be able afford to add these expanded resources as demand increases. Unfortunately, however, businesses often do not run according to plan. When such a situation exists in the context of web applications that are expanding rapidly upon fee-based cloud services platforms, economic disaster can quickly ensue.

As a result, many companies have been driven into bankruptcy by the very popularity which they were created to seek, by implementing auto-scaling systems that grew very large very quickly due to rapidly increasing demand, but which had no way to pay for these resources due to the currently-popular trend of attempting to attract end user "eyeballs" without worrying about making money along the way. As these cloud-based applications grow, costs mount, not merely as a result of the direct costs of the services and resources themselves, but also because of the often-larger indirect cost of system development, internal infrastructure, personnel, and other consequences of implementation, deployment and support of large complex information systems.

These companies are often found to be operating under the belief that, if only they could attract enough users, then investors would follow. However, this can create a foolish race between trying to raise investment before accruing costs swamp available capital. This dynamic can create a treacherous ground upon which to plant the seeds of a new Internet-based startup.

DETAILED DESCRIPTION OF ONE OR MORE EMBODIMENTS

The disclosure is particularly applicable to a web-based cloud service scrap-booking system that uses data link redirection and it is in this context that the disclosure will be described. It will be appreciated, however, that the system and method has greater utility since it may be used with various different cloud services and may be used to provide ways to build, deploy, and scale online cloud-based web applications or cloud services without necessarily requiring large investments in hardware infrastructure and network bandwidth. For example, the system may be used with any cloud service that requires a significant amount of data storage such as various content delivery systems and the like.

In one embodiment, a method is provided that causes execution of an application on a client device, detection of a request from the client device to access a resource and using the application to redirect a link to provide the resource to the client device. Another embodiment provides an apparatus that has one or more processors and a non-transitory medium including instructions executable by the one or more processors for: causing execution of an application on a client device; detecting a request from the client device to access a resource; and using the application to redirect a link to provide the resource to the client device. In another embodiment, a non-transitory medium is provided that includes instructions for execution by one or more processors for: causing execution of an application on a client device; detecting a request from the client device to access a resource; and using the application to redirect a link to provide the resource to the client device.

Figure 1:
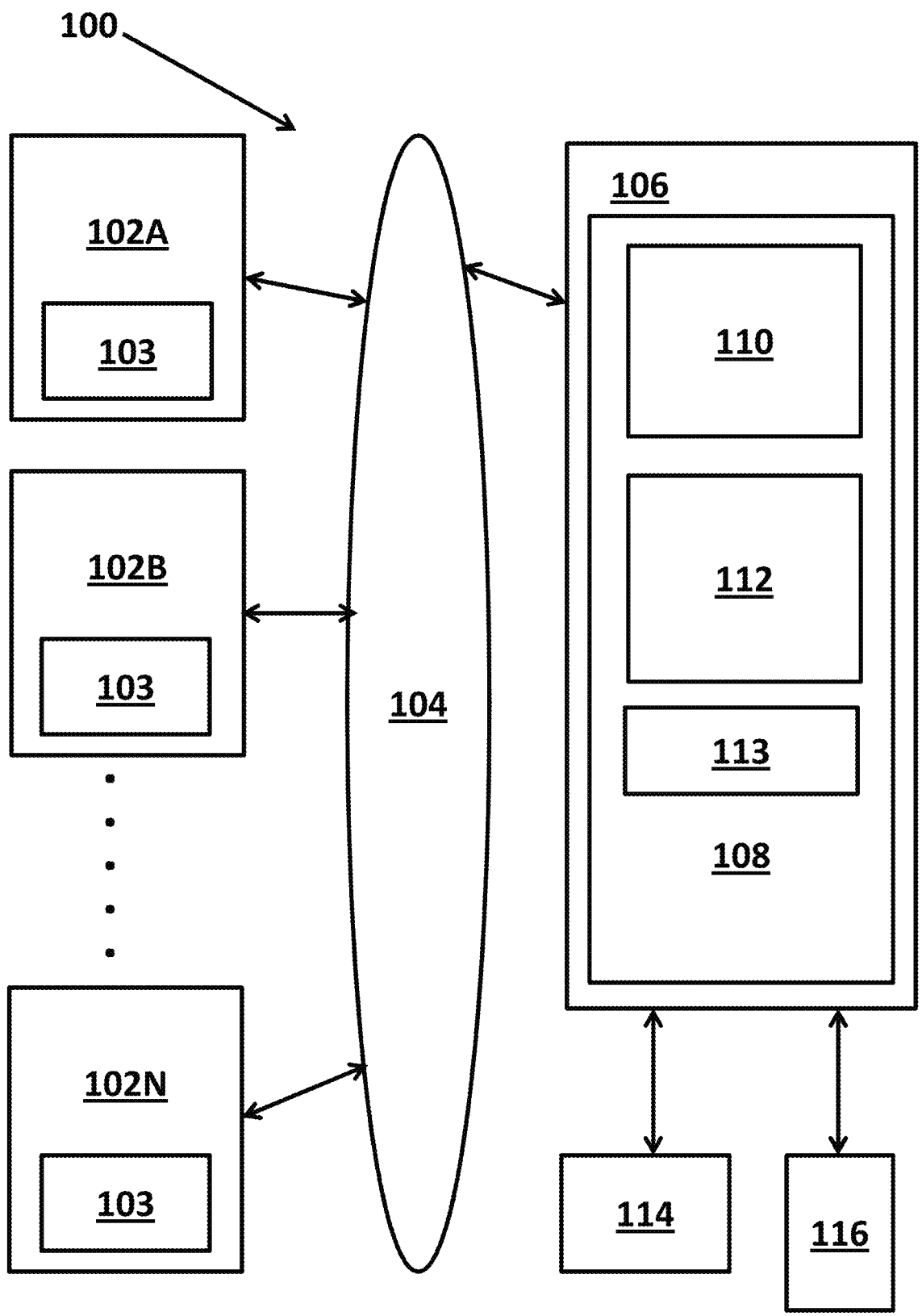
FIG. 1 illustrates an example of an implementation of a web-based cloud services system that incorporates data link redirection.

FIG. 1 illustrates an example of an implementation of a web-based cloud services system 100 that incorporates data link redirection. A data link redirection component provides ways to build, deploy, and scale online cloud-based web applications/cloud services without necessarily requiring large investments in hardware infrastructure and network bandwidth. The system 100 may include one or more computing devices 102, such as 102A, 102B, . . . , 102N as shown in FIG. 1, that connect to and exchange data over a communications path 104 with a backend component 106 that may provide one or more cloud services. The backend component 106 may incorporate a data link redirection component 113 that provide ways to build, deploy, and scale online cloud-based web applications or cloud services without necessarily requiring large investments in hardware infrastructure and network bandwidth as described below in more detail.

Each computing device 102 may be a client that communicates with and uses the one or more cloud services. Each computing device 102 may be a processor based device with at least one processor, memory, persistent storage, a display and connectivity circuits that can be used by a user to connect to and interact with the backend and the one or more cloud services. For example, each computing device may be a smartphone device, such as an Apple® iPhone® or an Android® operating system based device, a tablet computer device, a personal computer device, a terminal device, a laptop computer device and the like. In some embodiments, each computing device 102 may store (or download) and use an application 103 that is a plurality of lines of computer code that may be executed by the processor of the computing device 102 to communicate with and interact with the one or more cloud services. The application may be a browser application, a mobile application or any other application. In one example of the system when used for scrapbooking, the application may be a Keepsayk™ app that is described in more detail below. The browser application may have a well-known Uniform Resource Locator (URL) address bar (address bar) that displays a URL address from which the browser application is retrieving data.

The communications path 104 may be a wired communications path or wireless communications path or a combination of the two. For example, the communication path 104 may be Ethernet, a wireless data network, a wireless computer data network, a wireless cellular data network, a computer data network and the like. The communication path may use various communication protocols, such as HTTP or HTTPS as well as various data transfer protocols, such as HTML, JSON to provide the communication path between the one or more computing devices 102 and the one or more cloud services hosted by and provided by the backend 106.

The backend component 106 may include one or more cloud services components 108 (only one is shown in FIG. 1 for clarity) and each cloud service component 108 may further have a web server component 110 and an API server component 112 wherein the components of the cloud services component 108 communicate with each computing device 102 and provide the cloud service to each computing device 102. The cloud services component 108 or each app 103 on each computing device may further comprise a data link redirection component 113. The backend component and its components may be implemented using one or more computing resources such as server computers, processors, memory, persistent storage components, blade computers and the like. Each of the components 108, 110, 112, 113 may be implemented in hardware or software. When a component is implemented in software, the component may be a plurality of lines of computer code that may be executed by a processor so that the processor is configured to perform the operations and functions of those components as described below. When a component is implemented in hardware, the component is a circuit, such as a programmable logic device, microcontroller, application specific integrated circuit and the like, that performs the operations and functions of those components as described below.

The backend component 106 may be capable of connecting with and exchanging data with one or more other systems. For example, the backend component may be coupled to a data storage system 114 that may be a database server and a third party data storage system 116 as shown. The third party data storage system 116 and the data link redirection component allows the system to build, deploy, and scale online cloud-based web applications/cloud services without necessarily requiring large investments in hardware infrastructure and network bandwidth.

The web server component 110 may receive data requests for each computing device (and more specifically each application 103 of each computing device) and exchange data with each computing device as described below with reference to FIG. 2. The API server component 112 may respond to the data requests and provide code and data identifiers for the requested data. The data link redirection component 113 receives the data identifiers for the requested data and then generates a redirect as described below so that the data request is redirected to the third party data storage system 116 as described below with reference to FIG. 2.

Figure 2:
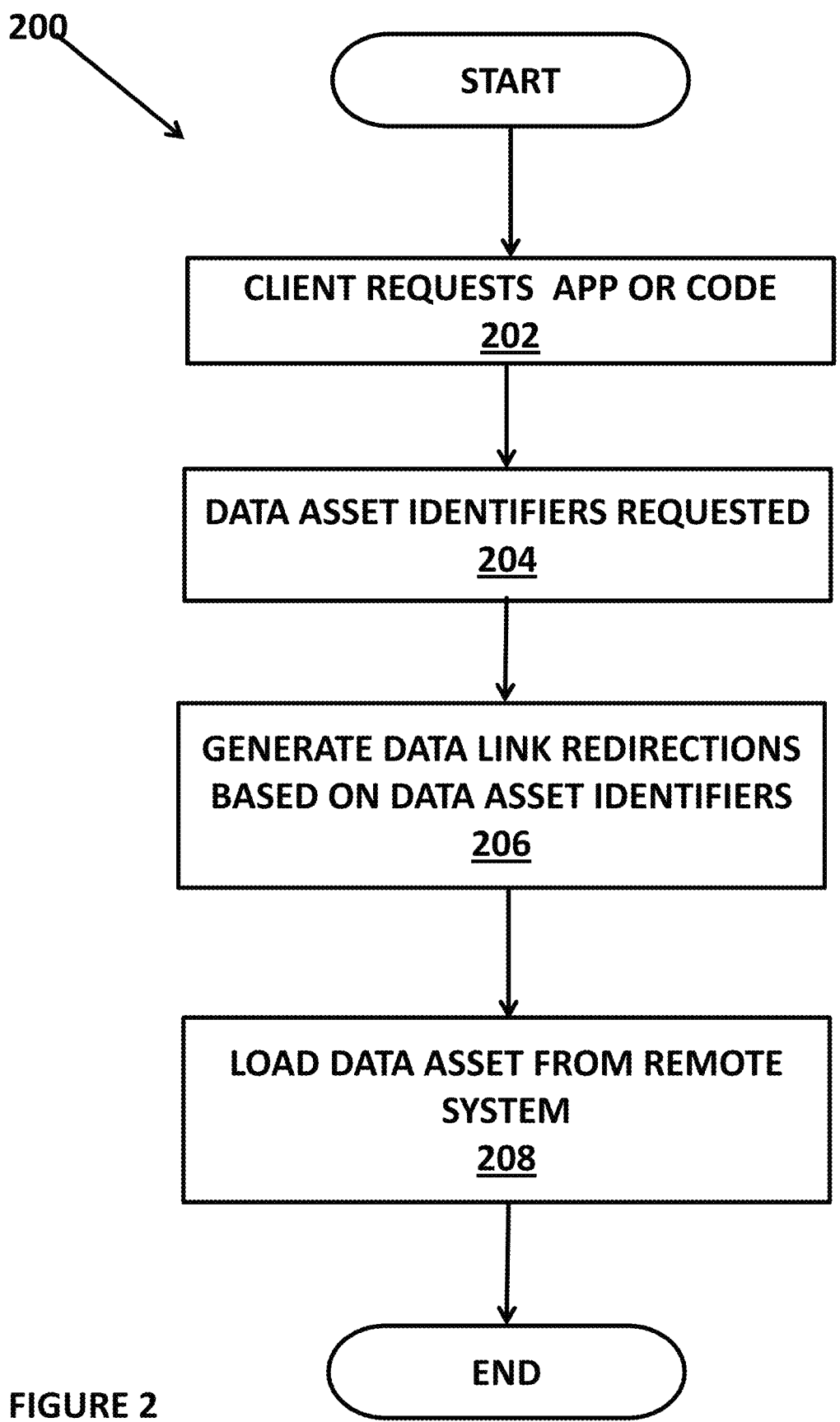
FIG. 2 illustrates a method for providing cloud services using data link redirection.

FIG. 2 illustrates a method 200 for providing cloud services using data link redirection. The method and processes in FIG. 2 may be implemented by the components of the cloud services component 108 in FIG. 1 for example, but may also be implemented using other hardware and software components. In the method, a client (implemented using the application 103 on one of the computing device 102 in FIG. 1) may request an app or code (202) in order to interact with a particular cloud service and the app or code may be downloaded to the particular computing device. The app or code may then be used to request additional code and one or more data asset identifiers (204) for one or more data assets requested by the client from the cloud services component. Each data asset may be a type of digital content such as an image, a video, text, audio and the like. Each data asset identifiers may identify a location for each requested data asset so that the data asset may be retrieved and downloaded by the client.

In the method, data link redirections may be generated for each data asset based on the data asset identifier (206) for the data asset. In one embodiment, the generation of the data link redirections may be performed by the data link redirection component in FIG. 1. In one implementation, the method may use an HTTP 301 redirect. In a typical redirect to a remote resource, there may be a web client request and a web server response as follows:
  GET /asset/201.lrg.jpg
  Host: scrapbook.keepsayk.com
And the server would respond with:
  HTTP/1.1 301 Moved Permanently
  Location: https://dl.dropboxusercontent.com/s/kvvky4a5v68o20o/5.141.jpg As shown, in the prior systems, the "Status" response is typically "301 Moved Permanently". This results in the browser not only being redirected to the new location, but the web client browser address bar will reflect the new address. In order to make the redirected asset appear as if it is from the originating domain, such as scrapbook.keepsayk.com, the method substitutes the original asset URL in place of the "Moved Permanently" response.

Thus, the server response in the method of FIG. 2, for example, looks like:
  HTTP/1.1 301 /asset/201.lrg.jpg
  Location: https://dl.dropboxusercontent.com/s/kvvky4a5v68o20o/5.141.jpg With this response, the web browser's URL address bar continues to indicate the originating domain, such as keepsayk.com URL, so the data served in response to the redirected image asset request appears to have been served by the keepsayk.com server, while it actually has been served by the end-user's third-party cloud hosting server.

Returning to FIG. 2, the client may then load the one or more data assets from the remote system (208) using the data link redirection.

Figure 3:
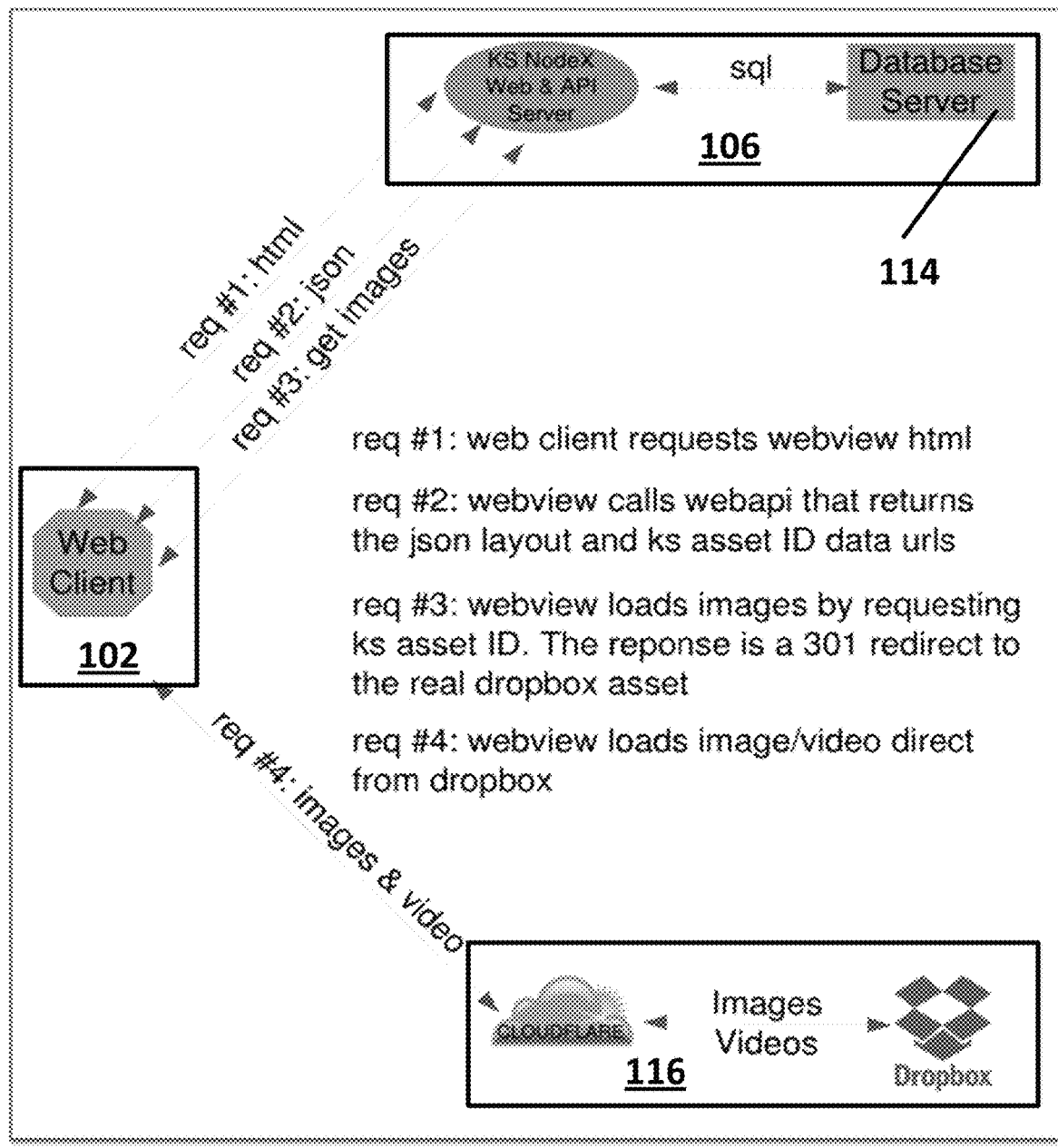
FIG. 3 illustrates an example of a content delivery system implementation of a web-based cloud services system that incorporates data link redirection.

Now, an example of a scrapbooking cloud service implementation of a web-based cloud services system that incorporates data link redirection as shown in FIG. 3 will be described. In the implementation shown in FIG. 3, each computing device may execute a "Keepsayk™ app" that may be a Keepsayk mobile iOS® app for the creation, editing, viewing and sharing of instant digital scrapbooks that combine photos, videos, text posts and captions into automatically-formatted beautiful presentations.

The backend component 106 shown in FIG. 1 may be implemented as the Keepsayk Mobile Supercloud (MSC), which expands the capabilities of the system beyond anything that was possible before in the mobile arena. The MSC allows the combination of multiple third-party cloud services into a single pool of resources available to the user for storing and sharing scrapbooks containing rich digital media. To do this, the MSC puts an abstracted layer over cloud storage, so Keepsayk's Supercloud system is not restricted to any individual third-party cloud provider in any way or fashion. Interfacing with each cloud services provider requires just one interface module. This means there can potentially be an unlimited number of cloud services that can be added to the system over time. The multi-cloud integration capabilities of MSC create a meta-cloud, what might be described as a "cloud of clouds." That capability, when combined with the ability of the MSC to also include the computational, data management and data storage capacity of the end user's mobile device, is what puts the "super" into the Mobile Supercloud approach.

Unlike previous approaches to cloud services scalability, where system growth often results in at least geometric increases in both direct and indirect costs relating to storage, CPUs, bandwidth, system development, internal infrastructure, personnel, and other consequences of implementation, deployment and support, a Keepsayk Pointe System (KPS) has been developed that is a novel approach to internal system design and integration with external systems. The KPS facilitates the creation of systems which can be expanded rapidly without the friction and complexity of previous approaches.

A good example of the user of the KPS system is within the Keepsayk MSC, which incorporates a web-based viewer for instant scrapbooks, where the HTML5 and CSS code for the scrapbook layout are located on the Keepsayk system servers (an implementation of the cloud services component 108 in FIG. 1), together with image caption and text asset information, but where the media data assets, photo images and video files, are located on a commercial cloud service (an implementation of the third party data storage system 116 in FIG. 1), such as Dropbox®. In order to create a unified experience for the end user, the user's web browser needs to appear to be pulling all of the data necessary to render each scrapbook from the Keepsayk server, however this would typically require that the Keepsayk server, at the very least, act as a proxy to Dropbox, first downloading images to Keepsayk before passing them on to the user. KPS avoids this requirement.

Rather than downloading images to the Keepsayk server, and rather than incorporating explicit links to media assets on the Dropbox server, KPS makes use of the web's existing mechanism for handling a dereferenced Uniform Resource Locator (URL) in order to provide a masked indirect link to the asset residing on the Dropbox servers, while the user only sees links that appear local to the Keepsayk system.

This provides high-performance access to those remotely-stored media assets, while also providing referential integrity to the Keepsayk system designer, and therefore the ability to create stable web interface designs, together with link reassignment and maintenance capabilities, while simultaneously maintaining the ability to provide Keepsayk and its users' link and asset privacy. In one embodiment, the KPS performs this feat by taking the approach of choreographing data by reference.

In dance, a fully extended vertical foot is said to be en pointe when its tip is touching the floor, even when not bearing weight. Similarly, the Keepsayk Pointe System allows web-based cloud applications to be fully extended to extraordinary scales, without having to support anything even approaching the weight of those scaled-up systems. Only the tip, the interface of the system, needs to be manipulated to virtually choreograph the data by indirect reference.

By the elegant manipulation of the web's 301-redirect mechanism, the Keepsayk node/web servers offload the heavy lifting of serving large volumes of rich media files to third-party cloud services, rather than having to directly communicate and handle that data within the core of the MSC. An illustration of the surprising results from taking this KPS approach can be seen in the exclamation of the Keepsayk developer who created the Pointe System upon first witnessing the efficiencies of this approach in action: "OMG, it freaking works."

KPS-based systems can still take advantage of Web-based caching services, to even further optimize response under heavy usage. Cloudflare (shown in FIG. 3), for example will cache the redirects just as they cache other web traffic, so repeated accesses of a given media asset don't have to reach the Keepsayk servers. Even without services such as Cloudflare, in many cases, the third-party cloud service becomes a cache analogue, since the redirects result in time-limited URLs that do not immediately expire.

By de-referencing the original URL requests from the users' browsers, and keeping those from the visibility of the end users, those end users are never able to see the original URL. This provides the ability to maintain link privacy for the end user's media asset data files, resident on the third-party cloud server, while sharing scrapbooks containing those media files. The KPS hides the URL, issues the 301 redirect, and then points the end user at the time-limited URL. The example for link privacy has been described above.

This approach also provides an advantage in the eventuality that Keepsayk ever receives a takedown request for a particular scrapbook media element. Using KPS, Keepsayk can easily respond to that request, because the original URL is hidden. All Keepsayk needs to do in such a situation is to remove (take down) the internal KPS representation of the URL link, and then invalidate the cache, thereby destroying the relevant redirect. Keepsayk can thereby remove that media element from the logical scrapbook structure without ever having to touch the original data asset file on the user's third-party cloud storage account.

In the example implementation shown in FIG. 3, the data flow process may include:

1) the web client sends a web page request to the node/web server for a web view of the scrapbook;

2) the node/web server makes an sql call via the webapi module to the database server, which then returns the sql query results to the node/web server;

3) the node/web server uses the returned data to build json code for the scrapbook layout;

4) the node/web server returns the scrapbook layout as json code and Keepsayk asset ID data URLs to the web browser;

5) the web browser loads images by requesting Keepsayk asset IDs via URL request to the node/web server;

6) the node/web server responds for each asset ID request with a 301 redirect pointing directly to the Dropbox location of the asset; and 7) The web browser loads each image or video asset directly from Dropbox The use of 301 redirects shown in step 6 allows for the deployment of efficient web services for a vast number of services without the performance impact and infrastructure requirements that other typical media-rich web-based cloud applications have needed. When this approach is then put together with the layering of multiple third-party cloud services, a synergistic combination results. The data-link-redirection design technology allows Keepsayk's MSC to scale the amount of accessible storage without the consequential complexity of having to manage the storage and bandwidth directly, resulting in the potential for virtually unlimited system growth without friction.

The Keepsayk Pointe System provides an extremely efficient way to build, deploy, and scale online cloud-based web applications without requiring large investments in hardware infrastructure and network bandwidth, thereby making it possible for small entities with very little in the way of capital resources to nevertheless be able to design, build, deploy and support web-based cloud applications of a large enough scale to support many millions of users at very low cost.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:

requesting, by a client, a data asset using a browser having an address bar;

receiving, by the client, a data asset identifier and a masked data link redirection for the requested data asset, the data asset identifier identifying a first location of the data asset;

retrieving, by the client, the data asset from a location different from the first location, wherein the masked data link redirection redirects the browser to the different location for retrieval of the data asset and the address bar of the browser displays the first location of the data asset specified by the data asset identifier;

wherein the redirection of the browser to a different location comprises using a 301 redirect; and wherein the data asset identifier identifying the first location has been substituted in place of a Moved Permanently string in the 301 redirect.

2. The method of claim 1, wherein generating the masked data link redirection further comprises using a dereferenced Uniform Resource Locator.

3. The method of claim 1 further comprising requesting, by the client, information from a cloud service wherein the information includes the requested data asset.

4. The method of claim 3, wherein the client is a scrapbooking application and the requested data asset is a data asset being laid out in the scrapbook.

5. The method of claim 3, wherein the address bar is able to be displayed to the user.

6. The method of claim 1, wherein the data asset identifier is a uniform resource locator for the data asset.

7. The method of claim 1, wherein the different location is a storage location on a third party system.

8. A system, comprising:

one or more processors, a computer readable memory storing program code which, when executed by the one or more processors, performs the acts of:

requesting, by a client, a data asset using a browser having an address bar;

receiving, by the client, a data asset identifier and a masked data link redirection for the requested data asset, the data asset identifier identifying a first location of the data asset;

retrieving, by the client, the data asset from a location different from the first location;

wherein the masked data link redirection redirects the browser to the different location for the retrieval of the data asset and the address bar of the browser displays the first location of the data asset specified by the data asset identifier;

wherein the redirecting of the browser to the different location comprises a 301 redirect; and wherein the data asset identifier identifying the first location has been substituted in place of the Moved Permanently string in the 301 redirect.

9. The system of claim 8, wherein the client requests information from a cloud service wherein the information includes the requested data asset.

10. The system of claim 8, wherein the data asset identifier is a uniform resource locator for the data asset.

11. The system of claim 8, wherein the different location is a storage location on a third party system.

12. The system of claim 11, wherein the client is a scrapbooking application and the requested data asset is a data asset being laid out in the scrapbook.

13. The system of claim 12, wherein the address bar is able to be displayed to the user.

14. A server computer for use in the World Wide Web distributed hypermedia network on the Internet, and for disseminating interactive content to two or more client computers via the World Wide Web distributed hypermedia network on the Internet, the server computer comprising: a processor; and a memory device which stores a plurality of instructions, which when executed by the processor, enables the processor to: a. receive a request for information; and b. cause a transfer of the information on to the World Wide Web distributed hypermedia network on the Internet, wherein: (i) at least part of the information is configured to enable a World Wide Web browser on each of the client computers to:

receive, by the client, a data asset identifier and a masked data link redirection for a requested data asset, the data asset identifier identifying a first location of the data asset;

retrieve, by the client, the data asset from a location different from the first location, wherein the masked data link redirection has been configured to redirect the browser to the different location for the retrieval of the data asset and has been configured to cause the address bar of the browser to display the first location of the data asset specified by the data asset identifier;

wherein the redirecting of the browser to the different location comprises using a 301 redirect, and wherein the data asset identifier identifying the first location has been substituted in place of the Moved Permanently string in the 301 redirect.

15. The server of claim 14, wherein the browser requests information from a cloud service wherein the information includes the requested data asset.

16. The server of claim 14, wherein the different location is a storage location on a third party system.

17. The server of claim 16, wherein the World Wide Web browser is enabled to display a scrapbooking application and the requested data asset is a data asset being laid out in the scrapbook.

18. The server of claim 16, wherein the address bar is able to be displayed to the user.

19. The server of claim 14, wherein the data asset identifier is a uniform resource locator for the data asset.

* * * * *